UNITED STATES PATENT OFFICE.

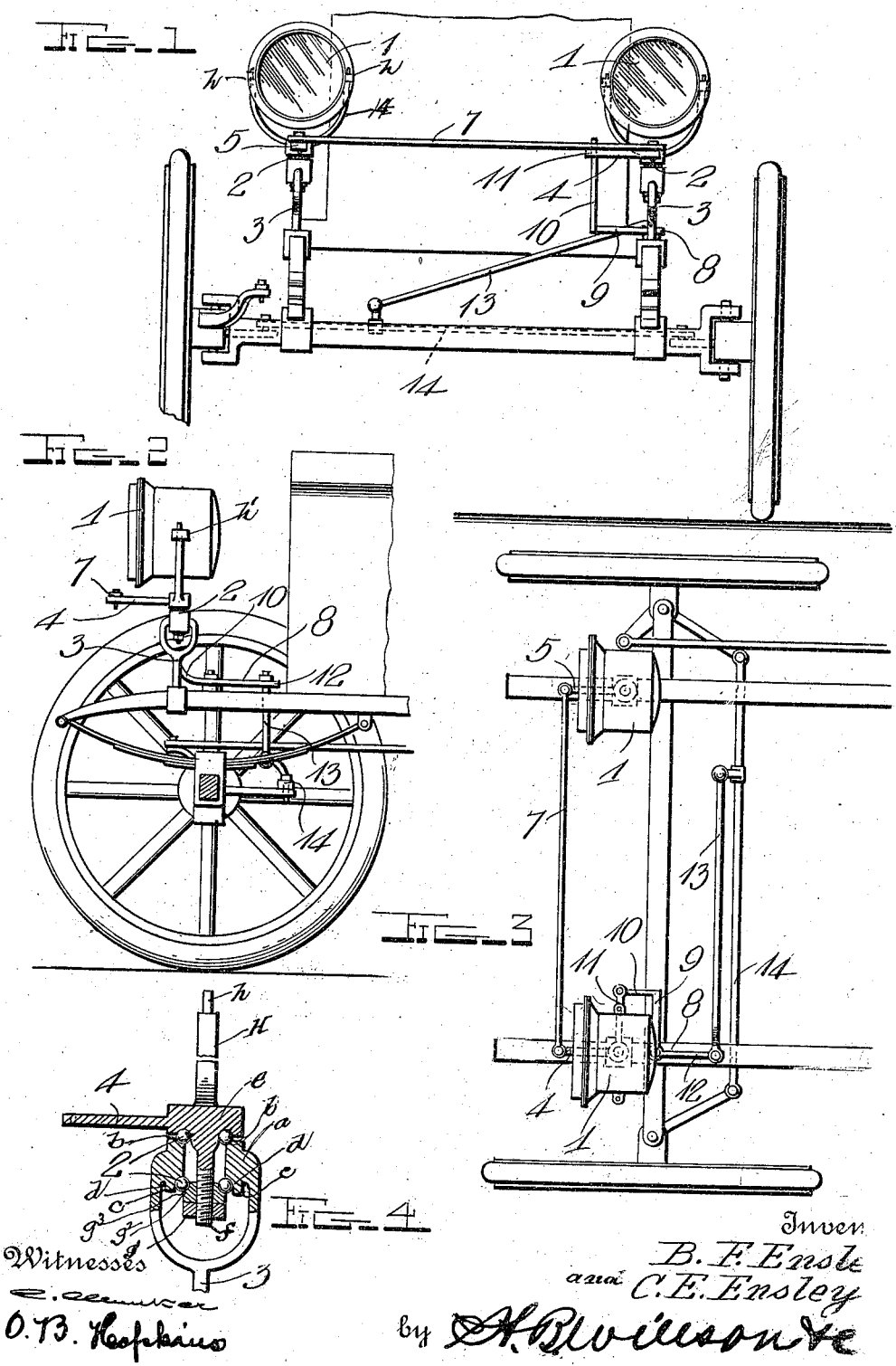

BENJAMINE F. ENSLEY AND CLARENCE E. ENSLEY, OF MOULTON, IOWA, ASSIGNORS OF ONE-HALF TO WERTER S. FARRAR, OF LINCOLN, NEBRASKA, AND LEONARD M. CLARK, OF MOULTON, IOWA.

BRACKET FOR AUTOMOBILE-LAMPS.

1,015,670.  Specification of Letters Patent.  Patented Jan. 23, 1912.

Application filed October 27, 1910. Serial No. 589,418.

*To all whom it may concern:*

Be it known that we, BENJAMINE F. ENSLEY and CLARENCE E. ENSLEY, citizens of the United States, residing at Moulton, in the county of Appanoose and State of Iowa, have invented certain new and useful Improvements in Brackets for Automobile-Lamps; and we do declare the following to be a full, clear, and exact description of the invention, such as will enable others skilled in the art to which it appertains to make and use the same.

Our invention relates to brackets for automobile lamps, and it consists in the construction and arrangement of parts, as will be hereinafter described and particularly pointed out in the claim.

In the accompanying drawings: Figure 1 is a front view of an automobile showing the application of the invention, to the lamps thereof. Fig. 2 is a side view of the front end of the automobile and one of the lamps showing an end view of the lamp operating mechanism. Fig. 3 is a plan view of the front running gear and a portion of the steering apparatus showing the arrangement of the lamp operating mechanism. Fig. 4 is a detail sectional view of one of the lamp sockets and bracket.

Referring more particularly to the drawings; 1 denotes the front lamps of the automobile said lamps being revolubly mounted in ball bearing sockets 2 which are adapted to be engaged with the usual lamp brackets 3 of the machine. Secured to the lower portion of one of the lamps is a bell-crank lever 4 while to the opposite lamp is connected a lever or crank arm 5. The crank arm 5 is connected to one arm 6 of the bell crank lever by a connecting rod 7.

Pivotally mounted on one of the springs or other suitable part of the machine frame is a bell crank operating lever 8 one arm 9 of which is connected by an upwardly projecting, forwardly curved operating bar 10 to the free arm 11 of the bell-crank lever 4 on the lamp. The opposite arm 12 of the bell-crank operating lever 8 is connected by an operating rod 13 to the steering rod 14 of the automobile steering gear. The operating rod 13 has a loose connection with the arm 12 of the bell crank lever 8 whereby the movement of the body of the automobile on the springs will not interfere with operating mechanism of the lamps.

By connecting the lamps with the steering rod as herein shown and described the lamps will be simultaneously operated by the movement steering apparatus to turn the lamps in either direction to which the front wheels of the machine are turned thus throwing the light continuously in the course or direction taken by the machine.

The lamp brackets are provided with hollow body portions each having an enlarged upper portion $a$ in the edges of which are oppositely disposed ball bearing sockets $b$. Said brackets are also provided with downwardly disposed projections $c$ at the base of the enlarged upper portion in which are formed ball bearing sockets $d$. A lever 4 has an enlarged inner end $e$, provided with a depending screw threaded arm $f$ which is inserted in the hollow bracket and is provided on its underface with ball bearing sockets which register with the ball bearing sockets $b$, in the upper portions of the enlargement $a$. The lower end of the arm has mounted thereon a plurality of nuts $g$ and $g'$, the upper one of which $g$ is provided with edge ball bearing sockets $g^3$, which register with the sockets $d$. Said nuts serve to clamp the enlarged inner end $e$, of the lever 4 on all of the ball bearing sockets together, when the balls are arranged in the sockets. The enlarged inner end $e$ of the lever 4 is provided with an upwardly projecting bifurcated lamp holder which straddles the lamp, said holder being provided with bearings $h$, at its upper ends to engage loops $h'$, on the sides of the lamp.

Having described our invention what we claim is—

An apparatus for automobile lamps comprising a hollow-bracket with an enlarged upper portion having edge ball bearing sockets therein, the base of said enlarged portion provided with downward projections also having ball bearing sockets therein, a lever having an enlarged inner end mounted over the upper end of the bracket and provided with ball bearing sockets on its under face, said lever having an arm projecting into the bracket and having a plurality of nuts thereon the upper one of which is provided with ball bearing sockets, said nuts adapted to clamp the ball bearing sockets together when the balls are arranged therein and said enlarged inner end of the lever having a bifurcated lamp holder projecting upwardly therefrom.

In testimony whereof we have hereunto set our hands in presence of two subscribing witnesses.

BENJAMINE F. ENSLEY.
CLARENCE E. ENSLEY.

Witnesses:
I. GLENN McQUEEN,
N. W. BURGHER.

Copies of this patent may be obtained for five cents each, by addressing the "Commissioner of Patents, Washington, D. C."